Sept. 21, 1937.　　W. J. SPENGLER　　2,093,935
MAGNETO GENERATOR
Filed May 7, 1936　　3 Sheets-Sheet 1

INVENTOR.
Walter J. Spengler
BY Clinton S. Janes
ATTORNEY.

Witness:
Burr W. Jones

Sept. 21, 1937. W. J. SPENGLER 2,093,935
MAGNETO GENERATOR
Filed May 7, 1936 3 Sheets-Sheet 2

INVENTOR.
Walter J. Spengler
BY
Clinton L. James
ATTORNEY.

Witness:
Burr W. Jones

Sept. 21, 1937.   W. J. SPENGLER   2,093,935
MAGNETO GENERATOR
Filed May 7, 1936   3 Sheets-Sheet 3

INVENTOR.
Walter J. Spengler
BY Clinton S. Janes
ATTORNEY.

Witness:
Burr W. Jones

Patented Sept. 21, 1937

2,093,935

UNITED STATES PATENT OFFICE 2,093,935

MAGNETO GENERATOR

Walter J. Spengler, Sidney, N. Y., assignor to Bendix Aviation Corporation, South Bend, Ind., a corporation of Delaware Application May 7, 1936, Serial No. 78,428

7 Claims. (Cl. 171—209)

The present invention relates to magneto generators and more particularly to multi-polar generators for ignition of internal combustion engines.

It is an object of the present invention to provide a novel magneto generator adapted to provide ignition current for a multi-cylinder engine, which is efficient in operation, light, simple and rugged in construction and economical to manufacture.

It is another object to provide such a device which is adapted to provide a spark for each 45 degrees of rotation of its rotor.

It is a further object to provide such a device in which the permanent magnet of the rotor is of simple construction, requiring very little machining.

It is another object to provide such a device in which the rotor is symmetrical in construction and in complete dynamic balance, while the component parts of the rotor are of simple form and largely interchangeable.

It is a further object to provide such a device in which the magnetic elements of the stator are rigidly self-supporting prior to the incorporation thereof in the frame of the magneto and during the casting of the frame.

Another object is to provide such a device in which the rotor and stator are so formed that a plurality of poles thereof cooperate simultaneously so as to secure a large cross-sectional area for the flux paths, while permitting a plurality of reversals of flux therethrough for each revolution of the rotor.

Further objects and advantages will be apparent from the following description taken in connection with the accompanying drawings in which.

Figure 1:
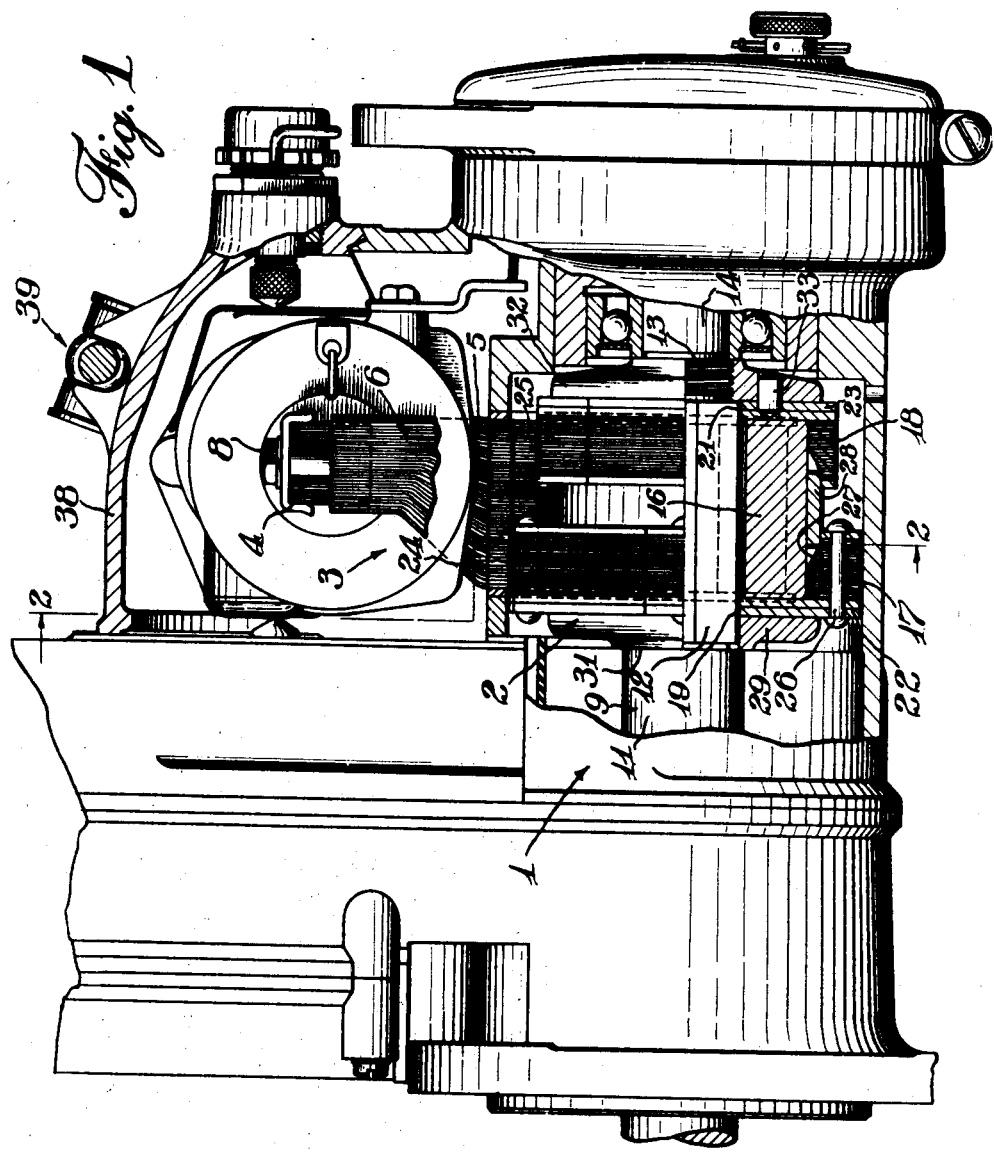
Fig. 1 is a side elevation, partly broken away, of a magneto embodying a preferred embodiment of the invention.
Figure 2:
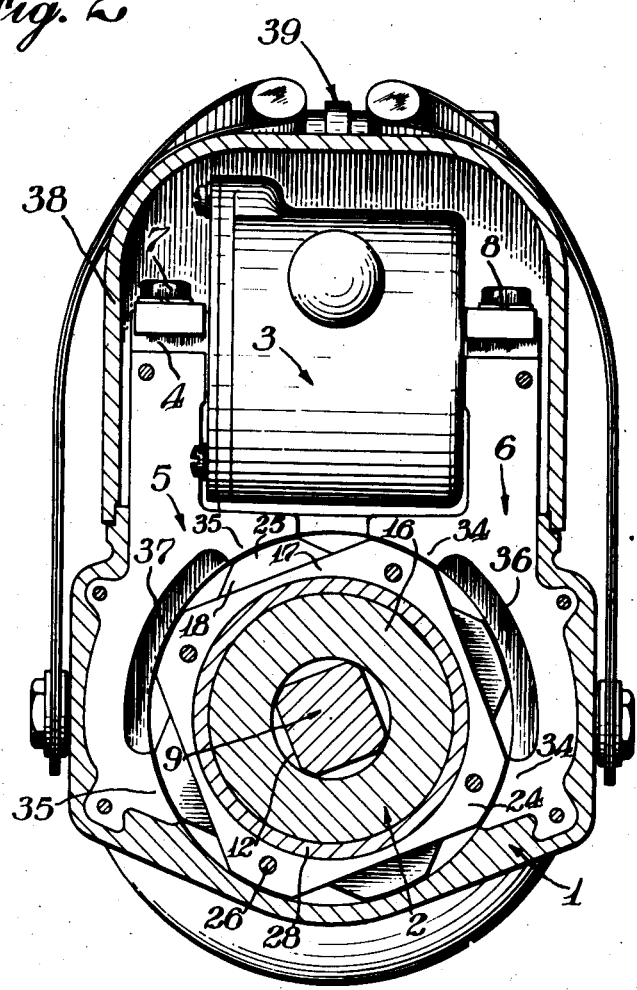
Fig. 2 is a section taken substantially on the line 2—2 of Fig. 1.

Referring first to Fig. 1 of the drawings, there is illustrated a magneto comprising a frame indicated generally at 1 having a rotor 2 suitably journalled therein and a coil 3 fixed therein with its core 4 mounted transversely to the casing as best shown in Fig. 2. Stator pole elements 5 and 6 are suitably mounted in the frame 1 as by being cast therein and are formed at their upper ends to receive the projecting portions of the core 4 of the coil which are suitably anchored thereto as by means of cap screws 7 and 8.

Figure 4:
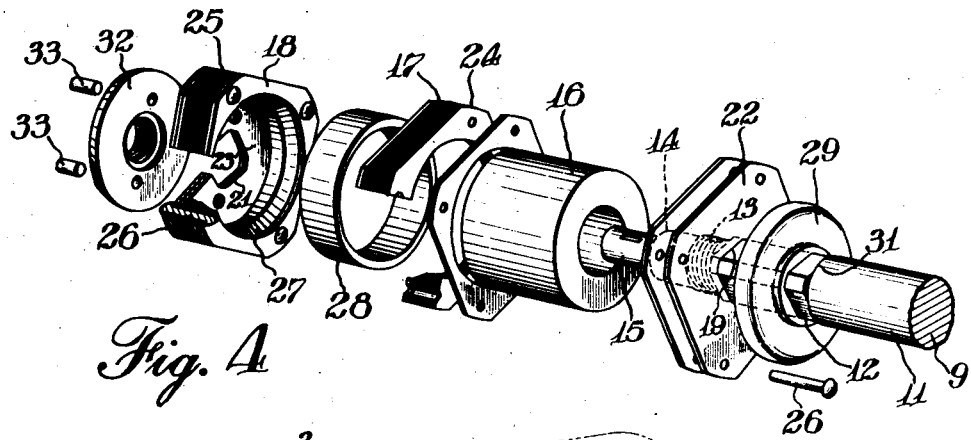
Fig. 4 is a perspective view of the component elements of the rotor in disassembled relation and partly broken away.
Figure 3:
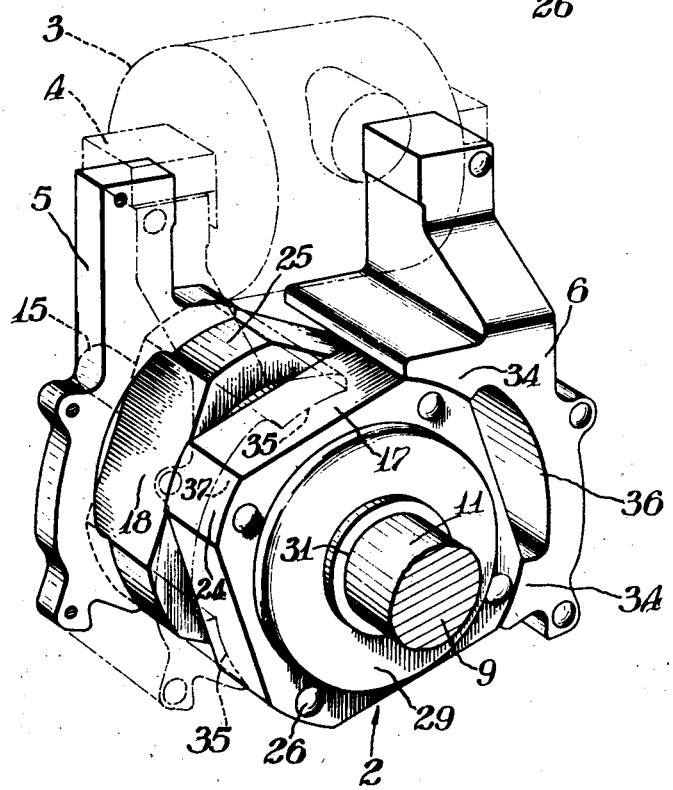
Fig. 3 is a perspective and partially a phantom view showing principally the elements composing the magnetic circuits of the magneto.

Referring now more particularly to Figs. 3 and 4, it will be seen that the rotor 2 comprises a shaft 9 having a smooth portion 11, a squared portion 12, a reduced threaded portion 13, a reduced cylindrical portion 14 and a still further reduced cylindrical portion 15. A cylindrical permanent magnet 16 so magnetized as to have its poles at the ends of the cylinder is loosely mounted on the squared portion 12 of the shaft and is provided with polar elements 17 and 18 embracing the ends of the magnet and non-rotatably mounted on the squared portion 12 of the shaft by means of corresponding squared openings 19, 21 in the terminal disc elements 22 and 23 thereof.

The polar elements 17 and 18 are formed of laminations of magnetic material having a rounded polygonal outline forming poles or lobes 24 and 25 respectively, held in assembled relation by suitable means such as rivets 26. The openings 19 and 21 in the discs 22 and 23 are circumferentially spaced through an angle equal to one-half the side of the respective polygons so that the lobes 24 and 25 are equally spaced alternately about the circumference of the rotor. As here shown, the polar members 17 and 18 are formed as rounded squares which are rotated through 45 degrees with respect to each other.

The polar members are preferably flared internally as shown at 27 (see also Fig. 1), and a centering and enclosing ring 28 of non-magnetic material is placed between the polar members when in assembled position. Means for confining the polar members on the shaft and compressing the magnet 16 therebetween is provided in the form of an abutment disc 29 adapted to bear against the shoulder 31 of the shaft formed at the junctions of the smooth portion 11 and squared portion 12 thereof, and a second abutment flange 32 threaded on the threaded portion 13 of the shaft and retained by suitable means such as pins 33 projecting through the flange into the discs 23 as shown in Fig. 1.

The stator pole elements 5 and 6 are formed of sufficient width, as best seen in Fig. 3, to cooperate with both the rotor polar elements 17 and 18, and are provided with pairs of poles 34 and 35 respectively, having surfaces concentric with the rotor and spaced so as to cooperate simultaneously with a pair of polar lobes 24 or 25 of the rotor. The spaces 36 and 37 (Figs. 2 and 4) between the stator pole surfaces 34 and 35 are made of sufficient depth to prevent any significant amount of flux from passing from a rotor lobe to the stator pole element when the lobe is at an intermediate position with respect thereto. It will thus be seen by reference to Figs. 2 and 3 that when two of the lobes of one rotor pole element such as lobes 24 of element 17 cooperate with the polar surfaces 34 of the stator pole 6, the remaining lobes of that rotor element are spaced from the polar surfaces 35 of stator pole member 5; while a pair of lobes 25 of rotor element 18 cooperate with the polar surfaces 35 of stator pole 5, so that a magnetic circuit is completed from the magnet 16 through a pair of rotor lobes 24, stator pole member 6, the core 4 of the coil, stator pole member 5 and a pair of rotor lobes 25 back to the opposite end of the magnet. Revolution of the rotor through an angle of 45 degrees causes the cooperation of the poles to be reversed, whereby the direction of the flux through the external magnetic circuit is reversed.

A cover 38 is preferably provided for enclosing the magneto, this cover being retained in place by any suitable means such as indicated at 39 in Figs. 1 and 2.

In the operation of this device, rotation of the shaft 9 from any suitable source of power derived from the engine to be ignited causes the lobes of the rotor to cooperate alternately with the stator pole members 5 and 6, causing flux from the magnet 16 to reciprocate through the core of the coil and generate current therein in the usual manner. It will be noted that by reason of the form of the rotor elements as rounded squares, there will be eight reciprocations of flux through the coil for each revolution of the rotor whereby the magneto may be used to ignite an engine having 16 cylinders when the magneto is driven at crankshaft speed. It will be obvious that by suitably shaping the contour of the rotor polar elements, the magneto may be adapted for the ignition of practically any type of engine without the necessity of driving the magneto at undesirably high speeds.

Although but one form of the invention has been shown and described in detail, it will be understood that other embodiments are possible and various changes may be made in the design and arrangements of the parts without departing from the spirit of the invention as defined in the claims appended hereto.

What is claimed is:

1. In a magneto a rotor including a shaft, a cylindrical permanent magnet mounted thereon, rounded polygonal polar members non-rotatably mounted on the shaft and providing coaxial seats for the ends of the magnet, means for pressing the polar members on the magnet, and a stator having a pair of pole shoes each of which is arranged to cooperate simultaneously with a plurality of the rounded portions of said polar members.

2. In a magneto a drive shaft, a cylindrical magnet mounted coaxially thereon, a pair of rounded polygonal polar members fixed on said shaft, each cooperating with one pole of said magnet, said polar members being angularly displaced with respect to each other so as to uniformly stagger the poles thereof, and a stator including fixed pole shoes each of which is adapted to cooperate alternately with a plurality of poles of one of said polar members while straddling the poles of the other polar member.

3. In a magneto rotor a shaft, a hollow cylindrical magnet mounted coaxially thereon, polar disc members fixedly mounted on said shaft with the polar elements thereof equally spaced alternately therearound, said elements being provided with coaxial seats for receiving the ends of said magnet, said seats having flared portions extending over the magnet, a centering ring adapted to surround the magnet and enter the flared portions of said seats, and means on said shaft for compressing the polar elements against the magnet and centering ring.

4. In a magneto a rotor comprising a shaft having a polygonal portion, metallic discs having corresponding polygonal openings mounted thereon, a hollow cylindrical magnet mounted on said shaft between said discs, and laminations of magnetic material fixed to said discs having circular openings adapted to receive the ends of the magnet, said laminations being of rounded polygonal shape to form a plurality of polar lobes.

5. In a magneto a rotor comprising a shaft having a polygonal portion, metallic discs having corresponding polygonal openings mounted thereon, a hollow cylindrical magnet mounted on said shaft between said discs, laminations of magnetic material fixed to said discs having circular openings adapted to receive the ends of the magnet, said laminations being of rounded polygonal shape to form a plurality of polar lobes, and means for anchoring a group of said laminations to said discs at each end of the magnet, with the polar lobes of each group spaced alternately about the periphery of the rotor.

6. In a magneto a rotor comprising a shaft having a polygonal portion, metallic discs having corresponding polygonal openings mounted thereon, a hollow cylindrical magnet mounted on said shaft between said discs, said discs being of rounded polygonal shape forming a plurality of peripheral lobes, the angular relationship between the lobes and the polygonal openings of the discs at each end of the magnet being symmetrically dissimilar so that said lobes are in staggered relation about the periphery of the rotor, and laminae of magnetic material fixed to said discs, having circular openings to receive the ends of the magnet and center the same on the shaft, and having peripheral polar lobes.

7. In a magneto a rotor comprising a shaft having a polygonal portion, metallic discs having corresponding polygonal openings mounted thereon, a hollow cylindrical magnet mounted on said shaft between said discs, said discs being of rounded polygonal shape forming a plurality of peripheral lobes, the angular relationship between the lobes and the polygonal openings of the discs at each end of the magnet being symmetrically dissimilar so that said lobes are in staggered relation about the periphery of the rotor, laminae of magnetic material fixed to said discs, having circular openings to receive the ends of the magnet and center the same on the shaft, and having peripheral polar lobes, and means for anchoring a group of said laminae to said discs at each end of the magnet, with the polar lobes of the laminae in alignment with the lobes of the respective discs.

WALTER J. SPENGLER.